(12) United States Patent
Kokeguchi (10) Patent No.: US 7,518,777 B2
(45) Date of Patent: Apr. 14, 2009

(54) DISPLAY ELEMENT

(75) Inventor: Noriyuki Kokeguchi, Tokyo (JP)

(73) Assignee: Konica Minolta Holdings, Inc. (JP)

( * ) Notice: Subject to any disclaimer, the term of this patent is extended or adjusted under 35 U.S.C. 154(b) by 0 days.

(21) Appl. No.: 11/915,694

(22) PCT Filed: Apr. 6, 2006

(86) PCT No.: PCT/JP2006/307304

§ 371 (c)(1),
(2), (4) Date: Nov. 27, 2007

(87) PCT Pub. No.: WO2006/129420

PCT Pub. Date: Dec. 7, 2006

(65) Prior Publication Data

US 2008/0204849 A1    Aug. 28, 2008

(30) Foreign Application Priority Data

May 31, 2005    (JP)    ............... 2005-158889

(51) Int. Cl.
G02F 1/153    (2006.01)
G02B 26/00    (2006.01)
H04N 9/24    (2006.01)

(52) U.S. Cl. ............... 359/270; 359/296; 348/814

(58) Field of Classification Search ............... 359/270, 359/242, 265, 269, 272–273, 277, 296; 250/70; 438/929; 345/49, 105; 349/182–186; 348/814
See application file for complete search history.

(56) References Cited

U.S. PATENT DOCUMENTS 4,240,716 A    12/1980    Camlibel et al.

FOREIGN PATENT DOCUMENTS

JP    8-262501    10/1996

(Continued)

OTHER PUBLICATIONS

International Search Report for International Application No. PCT/JP2006/307304 dated May 2, 2006.

(Continued)

Primary Examiner—Scott J Sugarman
Assistant Examiner—Dawayne A Pinkney
(74) Attorney, Agent, or Firm—Cantor Colburn LLP (57) ABSTRACT

This invention provides a display element that has a simple member construction, can be driven at a low voltage, has high display contrast and white display reflectance, and has reduced unevenness in images. The display element comprises opposed electrodes and an electrolyte containing silver or a compound containing silver in its chemical structure and a porous white scattered material provided between the opposed electrodes. The opposed electrodes are driven and operated so that silver is dissolved and precipitated. The display element is characterized in that the porous white scattered material is formed by coating an intimate water mixture containing titanium oxide, an aqueous polymer for binding the titanium oxide, and a thickening polysaccharide onto at least one of the opposed electrodes, and then drying the coating.

12 Claims, 1 Drawing Sheet

FOREIGN PATENT DOCUMENTS

| | | |
|---|---|---|
| JP | 9-297325 | 11/1997 |
| JP | 11-101994 | 4/1999 |
| JP | 2003-241227 | 8/2003 |
| JP | 2004-4267 | 1/2004 |
| JP | 2004-191838 | 7/2004 |
| JP | 2004-264693 | 9/2004 |
| JP | 2004-286884 | 10/2004 |
| JP | 2005-92183 | 4/2005 |
| WO | WO 2007087714 A1 * | 8/2007 |

OTHER PUBLICATIONS

JPO's English Translation of JP Appln. No. 8-262501.

JPO's English Translation of JP Appln. No. 2003-241227.

European Search Report for European Patent Application No. 06731252.0-2205/1887418 dated Sep. 4, 2008 with English Translation.

* cited by examiner

FIG. 1

DISPLAY ELEMENT

CROSS REFERENCE TO RELATED APPLICATIONS

This is a U.S. national stage of application No. PCT/JP2006/307304, filed on 6 Apr. 2006. Priority under 35 U.S.C. § 119(a) and 35 U.S.C. § 365(b) is claimed from Japanese Application No. 2005-158889, filed 31 May 2005, the disclosure of which is also incorporated herein by reference.

TECHNICAL FIELD

The present invention relates to an electrochromic display element utilizing silver dissolution and deposition.

BACKGROUND

In recent years, along with enhancement of the operation rate of personal computers, and popularization of network infrastructure, as well as an increase in capacity of data storage and a decrease in its cost, occasions have increasingly occurred in which pieces of information such as documents and images, which have been provided in the form of paper printed matter, are received as simpler electronic information and viewed as received electronic information.

As viewing means for such electronic information, mainly employed are those of light emitting types such as conventional liquid crystal displays and CRTs or recent organic electroluminescence displays. Specifically, when electronic information includes document information, it is required to watch any of the above viewing means for a relatively long period. However, it is hardly stated that the above viewing means are human friendly. It is common knowledge that light emitting type displays result in problems such as eye fatigue due to flicker, inconvenient portability, limitations in reading posture, necessity to look at still images, or an increase in power consumption.

As means to overcome the above drawbacks, are known reflection type displays (having memory function) which utilize outside light and consume no power to maintain images. However, it is difficult to state that due to the following reasons, they exhibit sufficient performance.

Namely, a system employing polarizing plates, such as a reflection type liquid crystal, results in a problem for a white display due to a low reflectance of approximately 40%. In addition, it is difficulty to state that most methods to produce structuring members are simple and easy. Further, polymer dispersion type liquid crystals require high voltage and the contrast of the resulting images is insufficient due to utilizing the difference in refractive indices between organic compounds. Still further, polymer network type liquid crystals result in problems such as application of high voltage and requirement of complicated TFT circuitry to enhance memory capability. Yet further, display elements employing electrophoresis require high voltage of at least 10 V and tend to suffer insufficient durability due to aggregation of electrophoretic particles. Further, electrochromic display elements, though being drivable at a low voltage of at most 3 V, result in insufficient color quality of black and common colors (namely yellow, magenta, cyan, blue, and red) and tend to result in problems such that, in order to secure memory capability, the display cell requires a complicated film structure such as vapor deposition film.

As a display system, which overcomes the drawbacks of each of the above systems, an electrodeposition (hereinafter referred to as ED) system has been known which utilizes dissolution and deposition of metals or salts thereof. ED systems exhibit advantages such as drivability at a low voltage of at most 3 V, a simple cell structure, excellent black and white contrast, or excellent black quality, for which various methods have been disclosed (refer, for example, to Patent Documents 1-3).

The inventors of the present invention conducted detailed investigation of technologies disclosed in each of the above Patent Documents, and came upon the following problems. In conventional technologies, when white pigments were dispersed in an electrolyte, the resulting dispersion stability of the white pigments was insufficient, whereby white display reflectance fluctuated over an elapse of time. Alternatively, when non-woven fabric or filter paper is employed as a white scattering member, difference in the refractive index from organic materials in the electrolyte is small. As a result, problems were found in which white display reflectance was not sufficient, leading to further investigation. As a result, it was found that these problems were solved by arranging porous white scattering materials between counter electrodes. However, it was found that non-uniform thickness of the white scattering layer resulted, depending on the preparation method of the relatively thick white scattering layer, whereby image mottle is formed.

Patent Document 1: U.S. Pat. No. 4,240,716
Patent Document 2: Japanese Patent No. 3428603
Patent Document 3: Japanese Patent Publication Open to Public Inspection (hereinafter referred to as JP-A) No. 2003-241227

SUMMARY OF THE INVENTION

Problem to be Solved by the Invention

In view of the foregoing, the present invention was achieved. An object of the present invention is to provide a display element, which is composed of a simple member structure, is drivable at a low voltage, exhibits high display contrast and high white display reflectance, and minimizes image mottle.

Means for Solving the Problems

The above problems of the present invention were solved employing the following embodiments.

1. A display element which comprises, between counter electrodes, an electrolyte containing silver or a compound containing silver in the chemical structure and a porous white scattering martial, and the counter electrodes of which are subjected to driving operation so that silver is dissolved and deposited, which is characterized in that the porous white scattering material is formed in such a manner that an aqueous mixture containing titanium oxide, an aqueous polymer which binds the aforesaid titanium oxide and a polysaccharide thickener is applied onto at least one of the aforesaid counter electrodes and subsequently dried.

2. The display element, described in 1. above, which is characterized in that, while applying the aforesaid aqueous mixture onto at least one of the aforesaid counter electrodes, the temperature of the aforesaid aqueous mixture is 25-85° C.

3. The display element, described in 1. or 2. above, which is characterized in that after applying the aforesaid aqueous mixture onto at least one of the aforesaid counter electrodes, the aforesaid aqueous mixture is cooled to 1-25° C.

4. The display element, described in any one of 1. through 3. above, which is characterized in that the viscosity of the cooled aqueous mixture described in 3. above is 100-1,000,000 mPa·s.

5. The display element, described in any one of 1. through 4. above, which is characterized in that coating thickness is 10-200 μm while applying the aforesaid aqueous mixture onto at least one of the aforesaid counter electrodes.

6. The display element, described in any one of 1. through 5. above, which is characterized in that the added amount of a polysaccharide thickener in the aforesaid aqueous mixture is 0.01-2% by weight with respect to water.

7. The display element, described in any one of 1. through 6. above, which is characterized in that the average diameter of the primary particles of the aforesaid titanium oxide is 0.2-0.7 μm.

8. The display element, described in any one of 1. through 7. above, which is characterized in that the aforesaid polysaccharide thickener is carrageenan.

9. The display element, described in any one of 1. through 8. above, which is characterized in that the aforesaid electrolyte contains at least one of the compounds represented by following Formula (1) or (2), and at least one of the compounds represented by following Formula (3) or (4).

Formula (1)

wherein L represents an oxygen atom or $CH_2$, and each of $R_1$-$R_4$ represents a hydrogen atom, an alkyl group, an alkenyl group, an aryl group, a cycloalkyl group, an alkoxyalkyl group, or an alkoxy group.

Formula (2)

wherein each of $R_5$ and $R_6$ represents a hydrogen atom, an alkyl group, an alkenyl group, an aryl group, a cycloalkyl group, an alkoxyalkyl group, or an alkoxy group.

Formula (3)

wherein each of $R_7$ and $R_8$ represents a substituted or unsubstituted hydrocarbon group. When a ring containing an S atom is formed, an aromatic group is not to be included. Further, the atom adjacent to the S atom of $R_7$ and $R_8$ is not S.

Formula (4)

wherein M represents a hydrogen atom, a metal atom, or quaternary ammonium; Z represents a nitrogen-containing heterocyclic ring excluding an imidazole ring; n represents an integer of 0-5; $R_9$ represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an arylcarbonyl group, an acyloxy group, a carboxyl group, a carbonyl group, a sulfonyl group, an amino group, a hydroxyl group, or a heterocyclic group. When n is at least 2, each $R_9$ may be the same or different and may be joined to form a condensed ring.

10. The display element, described in any one of 1. through 9. above, which is characterized in that the conditions specified by following Formula (1) are satisfied:

$$0 \leq [X]/[Ag] \leq 0.01 \qquad \text{Formula (3)}$$

wherein [X] represents mol concentration (mol/kg) of halogen ions or halogen atoms contained in the above electrolyte contains, and [Ag] represents total mol concentration (mol/kg) of silver or a compound containing silver in the chemical structure, contained in the aforesaid electrolyte contains.

11. A display element comprising an electrolyte containing silver or a compound containing silver in the chemical structure, a porous white scattering material containing titanium oxide and a water-soluble polymer which binds the aforesaid titanium oxide, and a polysaccharide thickener, between counter electrodes.

12. The display element, described in any one of 1. through 11. above, which is characterized in that the aforesaid driving operation results in deposition of blackened silver under application of voltage of at least deposition overvoltage and deposition of blackened silver is continued under application voltage of at most deposition overvoltage.

ADVANTAGE OF THE INVENTION

According to the present invention, it is possible to provide a display element which is composed of a simple member structure, is drivable at low voltage, exhibits high display contrast and high white display reflectance, and minimizes image mottle.

DESCRIPTION OF THE NUMERALS 1 counter electrode
2 electrolyte layer
3 power source
4 grounding

OPTIMAL EMBODIMENT OF THE PRESENT INVENTION

Optimal embodiments to achieve the present invention will now are detailed, however, the present invention is not limited thereto.

In view of the foregoing, the inventors of the present invention conducted diligent investigation and achieved the present invention by discovering the following. A display element which comprises, between counter electrodes, an electrolyte which contains silver or compounds containing silver in the chemical structure and porous white scattering material, and of which the counter electrodes are subjected to driving operation so that silver was dissolved and deposited, which is characterized in that the porous white scattering material has been formed by applying an aqueous mixture containing titanium oxide, aqueous polymers binding the titanium oxide, and polysaccharide thickeners onto at least one of the electrodes and subsequently dried. The resulting display element was composed of a simple member structure, was drivable at low voltage, exhibited high display contrast and high white display reflectance, and minimized image mottle.

The present invention will now be detailed.

The display element of the present invention is an ED system display element which contains, between counter electrodes, an electrolyte containing silver, or compounds containing silver in the chemical structure, and in which the above counter electrodes are drive-operated to result in dissolution and deposition of silver.

The display element of the present invention is prepared based on a novel preparation method in which titanium oxide, being porous white scattering particles, is dispersed in an aqueous solution of aqueous polymer which is substantially insoluble in an electrolyte solvent, and said aqueous mixture, containing a polysaccharide thickener, is coated and dried. Thereby, it is possible to secure dispersion stability by fixing each of the white scattering particles via an aqueous polymer, and to result in sufficient white reflectance due to the large difference in refractive index between the electrolyte and the white scattering particle. Further, by realizing formation via aqueous drying and coating, the preparation is simplified, whereby it is easy to increase the area. Further, by employing a coating and drying method using polysaccharide thickeners, features result in which it is due to higher layer thickness distribution accuracy of the coating, it is possible to form a uniform layer to reduce image mottle, and friendliness to environment is also realized.

(Compound Containing Silver, or Compound Containing Silver in their Chemical Structure)

A compound containing silver, or a compound containing silver in their chemical structure, according to the present invention, is common designations of a compound such as silver oxide, silver sulfide, metallic silver, colloidal silver particles, sliver halide, silver complex compound, or a silver ion. The phase states such as a solid state, a state solubilized to liquid, a gas state, and charge state types such as neutral, anionic or cationic are not particularly considered.

(Basic Structure of Cell)

Figure 1:
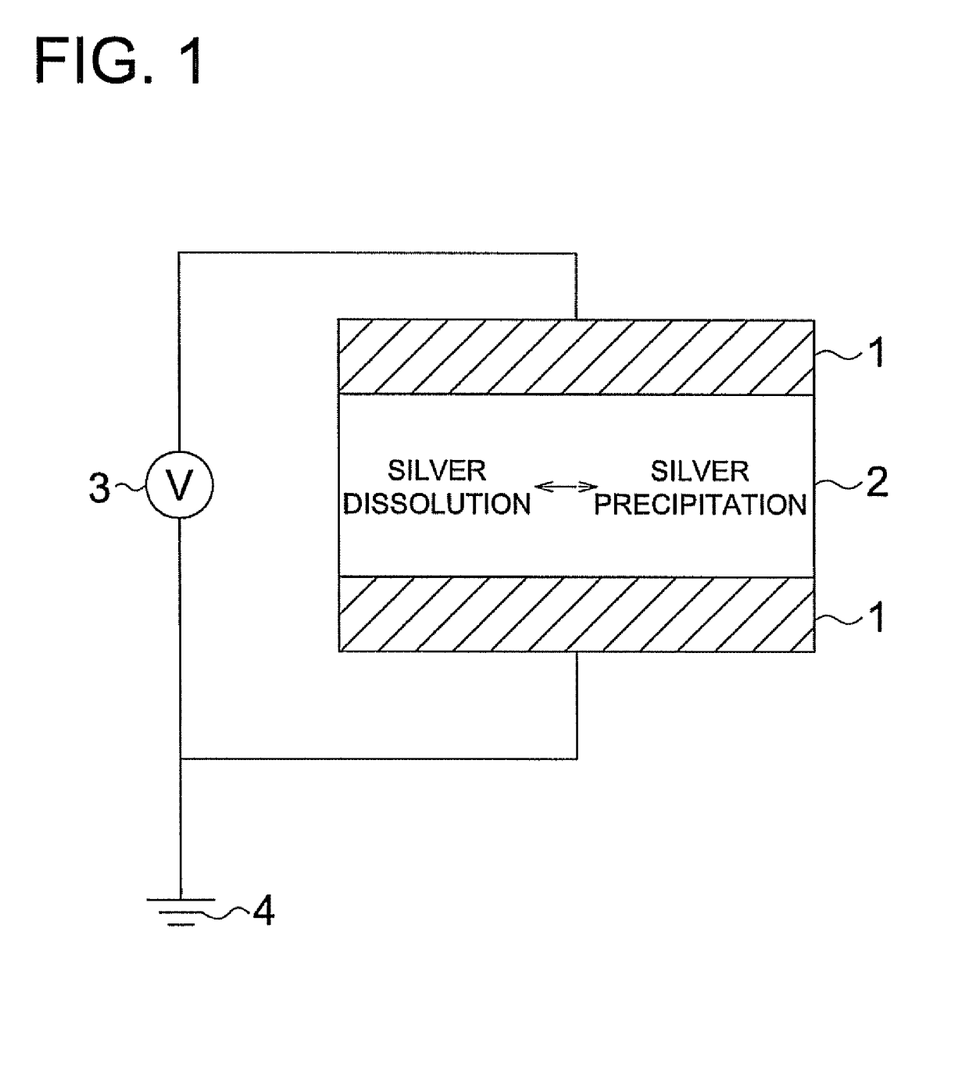
FIG. 1 is a schematic sectional view showing the basic structure of the display element of the present invention.

FIG. 1 is a schematic sectional view showing the basic structure of the display element of the present invention.

In FIG. 1, the display apparatus of the present invention has electrolyte layer 2 sandwiched between paired counter electrodes 1, and by applying voltage or electric current to the counter electrodes via power source 3, silver contained in electrolyte layer 2 undergoes a dissolution reaction or deposition reaction. The display element varies the display state utilizing the difference in optical properties of light transmission and absorption of the compound containing silver.

(Porous White Scattering Materials)

It is characterized that porous scattering materials according to the present invention are formed by coating and drying an aqueous mixture of aqueous polymers substantially insoluble in the electrolyte solvents and titanium oxide as a white pigment.

In the present invention, in view of minimization of coloration at high temperature and reflectance of elements due to refractive index, it is characterized that titanium oxide is employed as a white pigment, and it is possible to employ anatase or rutile type titanium oxide. Further, employed as titanium oxide may be titanium oxide which has been subjected to a surface treatment employing an inorganic oxide (such as $Al_2O_3$, $AlO(OH)$, or $SiO_2$), or titanium oxide which has been subjected to a treatment employing an organic compound such as trimethylolethane, triethanolamine acetic acid salts, or trimethylcyclosilane, in addition to the above surface treatment.

Listed as an aqueous polymer which is substantially insoluble in electrolyte solvent according to the present invention may be water-soluble polymer and polymer which dispersed in water based solvent.

A water-soluble compound according to the present invention includes a natural compound such as proteins, including gelatin or gelatin derivatives, cellulose derivatives, polysaccharides such as starch, gum Arabic, dextran, Pullulan, or carrageenan, as well as synthetic polymer compounds such as polyvinyl alcohol, polyvinylpyrrolidone, or acrylamide polymers and derivatives thereof. Gelatin derivatives include acetylated gelatin and phthalated gelatin. Polyvinyl alcohol derivatives include terminal alkyl group-modified polyvinyl alcohol and terminal mercapto group-modified polyvinyl alcohol. Cellulose derivatives include hydroxyethyl cellulose, hydroxypropyl cellulose, and carboxymethyl cellulose. Further, employed may be compounds described in Research Disclosure and on pages 71-75 of JP-A No. 64-13546, and high water absorptive polymers such as homopolymers of vinyl monomers having —COOM or —$SO_3$M (M being a hydrogen atom or an alkaline metal) and copolymers of these vinyl monomer or copolymers of these vinyl monomers and other vinyl monomers (for example, sodium methacrylate, ammonium methacrylate, and potassium acrylate), described in U.S. Pat. No. 4,960,681 and JP-A No. 62-245260.

In the present invention, preferably employed may be gelatin and derivatives thereof, or polyvinyl alcohol and derivatives thereof.

Listed as polymers dispersed in water based solvents may be latexes such as natural rubber latex, styrene butadiene rubber, butadiene rubber, nitrile rubber, chloroprene rubber, heat curable resins which are prepared by dispersing, in water based solvents, polyisocyanate based, epoxy based, acryl based, silicone based, polyurethane based, urea based, phenol based, formaldehyde based, epoxy-polyamide based, melamine based, or alkyd based resins, or vinyl based resins. Of these polymers, it is preferable to employ water based polyurethane resins described in JP-A No. 10-76621.

"Being substantially insoluble in electrolyte solvents", as described in the present invention, is defined as a state in which the dissolved amount per kg of the electrolyte solvents is 0-10 g in the temperature range of −20 to 120° C. It is possible to determine the above dissolved amount employing the methods known in the art, such as a weight measuring method, or a component quantitative method utilizing liquid chromatogram and gas chromatogram.

A preferred embodiment of the aqueous mixture of water based compounds according to the present invention and titanium oxide is that titanium oxide is dispersed in water based on the dispersion methods known in the art. The mixing ratio of water based compounds/titanium oxide is preferably in the range of 1-0.01 in terms of volume ratio, but is more preferably in the range of 0.3-0.05.

The aqueous mixture according to the present invention is capable of containing organic solvents which exhibit a dissolved weight of at least 100 g with respect to 1 L of water at 25° C. Via incorporation of the above organic solvents, it is possible to regulate the viscosity and drying rate of the aqueous mixture. Examples of the above organic solvents include, but are not limited to, methanol, ethanol, 1-propanol, 2-propanol, methyl cellosolve, butyl cellosolve, acetone, methyl ethyl ketone, ethylene glycol, diethylene glycol, and triethylene glycol monobutyl ether.

Media to coat the aqueous mixture of the water based compounds according to the present invention and titanium oxide may be located anywhere as long as they are located on the structural components between the counter electrodes of the display element. However, it is preferable that they are provided on at least one of the above counter electrodes. Examples of media providing methods include a coating system, a liquid spraying system, a spraying method via a gas phase, such as a system which jets liquid droplets employing vibration of a piezoelectric element such as a piezoelectric system ink-jet head, a BUBBLE JET (registered trade name) ink-jet head which ejects liquid droplets employing a thermal head utilizing bumping, and a spray system in which liquid is sprayed via air or liquid pressure.

An appropriate coating system may be selected from any of the coating systems known in the art, and examples thereof include an air doctor coater, a blade coater, a rod coater, a knife coater, a squeeze coater, an impregnation coater, a reverse roller coater, a transfer roller coater, a curtain coater, a double roller coater, a slide hopper coater, a gravure coater, a kiss roller coater, a bead coater, a spray coater, a calender coater, and an extrusion coater.

In the present invention, it is characterized that while applying the aqueous mixture onto at least one of the counter electrodes, the temperature of the aqueous mixture is 25-85° C. When the temperature is at most 25° C., in order to control the temperature of the liquid, both cooling and heating operations are required which make the liquid management apparatus complex. On the other hand, when the temperature exceeds 85° C., liquid evaporation management is required, which also makes the liquid apparatus complex. The above temperature is more preferably in the range of 35-65° C.

The present invention is characterized in that after applying the aqueous mixture onto at least one of the counter electrodes, the aqueous mixture is cooled to the range of 1-25° C., and is also characterized in that the viscosity of the cooled aqueous mixture is 100-1,000,000 mPa·s. By realizing the above operation, the shape stability of the coating is increased due to enhancement of viscosity of the aqueous mixture, depending on temperature characteristics of added polysaccharide thickeners to enhance shape stability of the coating, and drying is carried out while maintaining the above shape stability, whereby it is possible to prepare a dried layer of uniform thickness, employing a relatively simple coating operation.

The present invention is characterized in that during applying the aqueous mixture onto at least one of counter electrodes, coating thickness is 10-200 μm. When the thickness is less than 10 μm, the layer thickness of white scattering materials is insufficient, resulting in a decrease in white reflectance of white display of display elements, while when it is in the range of at least 200 μm, the coating thickness, in a wet state, is excessively high to result in fluidity of the water mixture, whereby it tends to become difficult to achieve a uniform layer thickness.

Methods to dry the aqueous mixture of water based compounds and titanium oxide provided on the electrode according to the present invention are not particularly limited as long as they facilitate water evaporation. Examples thereof include heating employing a heating source, a heating method employing infrared radiation, and a heating method utilizing electromagnetic induction. Further, water evaporation may be performed under reduced pressure.

Porosity, as described in the present invention, refers to the following state. After forming porous white scattering materials by applying the above aqueous mixture of the water based compounds and titanium oxide on the electrode(s) and subsequently drying the resulting coating, an electrolyte containing silver or compounds containing silver in their chemical structure is provided onto the resulting scattering material, followed by sandwiching employing the counter electrodes. The above state is such that when electric potential is applied between the resulting counter electrodes, it is possible to undergo silver dissolution and deposition reaction, and refers to a penetration state in which ion species are movable between the electrodes.

In the display element of the present invention it is preferable that the water based compounds undergo a hardening reaction employing hardening agents during coating and drying of the above aqueous mixture or after drying of the same.

Examples of hardening agents employed in the present invention include those described in the column 41 of U.S. Pat. Nos. 4,678,739, and 4,791,042, as well as JP-A Nos. 59-116655, 62-245261, 61-18942, 61-249054, 61-245153, and 4-218044. Specific hardening agents include aldehyde based hardening agents (formaldehyde), aziridine based hardening agents, epoxy based hardening agents, vinylsulfone based hardening agents (N,N'-ethylene-bis(vinylsulfonylacetamido)ethane), N-methylol based hardening agents (dimethylolurea), boric acid, and polymer hardening agents (refer to JP-A No. 62-234157). When gelatin is employed as a water based compound, of the above hardening agents, it is preferable to employ vinylsulfone type hardening agents and chlorotriazine type hardening agents, individually or in combinations. Further, when polyvinyl alcohol is employed, it is preferable to employ boron-containing compounds such as boric acid or metaboric acid.

The employed amount of these hardening agents is commonly 0.001-1 g per g of the water based compounds, but is preferable 0.005-0.5 g. In order to increase layer strength, it is possible to employ a heat treatment and to regulate humidity during the hardening reaction.

(Polysaccharide Thickeners)

Polysaccharide thickeners according to the present invention may include polysaccharides extracted and purified from red algae and gellangum.

Polysaccharides extracted and purified from red algae are detailed on page 21 of "Shokuhin Kogyo (Food Industry)" Volume 31 (1988). Specifically known are agar-agar, κ-carrageenan, λ-carrageenan, τ-carrageenan, and furcellaran. In the present invention, preferred are κ-carrageenan, λ-carrageenan, and ι-carrageenan. Of these, more preferred are τ-carrageenan and κ-carrageenan, while κ-carrageenan is most preferred.

Natural polymer polysaccharides derived from the above red algae may be employed individually in a single liquid coating composition or in combinations of at least two-types. When κ-carrageenan is specifically employed, it is preferable to simultaneously employ λ-carrageenan in terms of enhanced physical properties of the resulting layer.

In such a case, the ratio of κ-carrageenan to λ-carrageenan is commonly in the range of 2:8-9:1 in terms of weight ratio, is preferably in the range of 4:6-8:2, but is more preferably in the range of 5:5-7:3.

Gellangum is polysaccharide composed of glucose, glucronic acid, and rhamnose sugar, and known as commercially available types are developing sample, gellangum K9A50, KELCOGEL for food and industrial products, and gellangum GELRITE for microorganism culture media, plant tissue cultures and confectionary production.

The concentration of natural polymer polysaccharides derived from red algae or gellangum in a liquid coating composition is commonly 0.02-5% by weight, is preferably 0.05-2% by weight, but is most preferably 0.1-1% by weight. The above preferred range varies depending on the type and concentration of water based polymers in the employed liquid coating composition and is not ambiguous. However, when only gelatin, natural polymer polysaccharides derived from red algae or gellangum are employed in the liquid coating composition, the above range is preferably employed in the case of a gelatin concentration of 1-6% by weight.

When gelatin concentration exceeds the above limit, natural polymer polysaccharides derived from red algae or gellangum at lower concentration is employed.

Further, when a liquid coating composition which contains natural polymer polysaccharides derived from red algae or gellangum, contains gelatin, the weight ratio of natural polymer polysaccharides derived from red algae or gellangum to gelatin is preferably in the range of 0.02-0.40.

It is preferable that the liquid coating composition according to the present invention, which contains natural polymer polysaccharides derived from red algae or gellangum, further contains gelatin or polyvinyl alcohol. When natural polymer polysaccharides derived from red algae or gellangum are not employed, employed gelatin concentration is commonly 4-10% in view of viscosity and setting properties of the liquid coating composition. However, in the present invention, by simultaneously employing polysaccharide thickeners, the resulting setting temperature is increased, whereby stable use at a lower gelatin concentration, at which it is not possible to achieve setting by only employing gelatin, is achievable. Specifically, a liquid coating composition of a gelatin concentration of approximately 1% is settable. The upper limit of gelatin concentration is not particularly limited. Commonly, in many cases, it is determined by the viscosity of the liquid coating composition, and is commonly at most 8%, while it is preferably at most 6%.

The present invention is characterized in that the added amount of polysaccharide thickeners in the aqueous mixture is 0.01-2% by weight. When the added amount is less than 0.01% by weight, the viscosity increasing effect is insufficient to result in a decrease in uniform layer thickness, while when it exceeds 2% by weight, binding of titanium oxide particles is adversely affected to decrease binding strength, whereby durability of the resulting elements is degraded.

The present invention is characterized in that the diameter of the primary particles of titanium oxide is 0.2-0.7 μm. When the above diameter is at most 0.2 μm, light reflectance with respect to the added amount of titanium oxide decreases, while when it exceeds 0.7 μm, the spacing between particles increases. In both cases, the added amount of titanium oxide increases to realize white display with sufficient white, whereby resolution is degraded due to an increase in the distance between counter electrodes of the display element.

(Compounds Represented by Formula (1) or (2))

In the display element of the present invention, it is preferable that the electrolyte contains at least one compound represented by above Formula (1) or (2) and at least one compound represented by above Formula (3) or (4).

Initially, the compounds represented by Formula (1), according to the present invention, will now be described.

In above Formula (1), L represents an oxygen atom or $CH_2$, and each of $R_1$-$R_4$ represents a hydrogen atom, an alkyl group, an alkenyl group, an aryl group, a cycloalkyl group, an alkoxyalkyl group, or an alkoxy group.

Examples of the alkyl group include a methyl group, an ethyl group, a propyl group, an isopropyl group, a tert-butyl group, a pentyl group, a hexyl group, an octyl group, a dodecyl group, a tridecyl group, a tetradecyl group, and a pentadecyl group. Examples of the aryl group include a phenyl group, and a naphthyl group, while examples of the cycloalkyl group include a cyclopentyl group, and a cyclohexyl group. Examples of the alkoxyalkyl group include a β-methoxymethyl group, a γ-methoxypropyl group, while examples of the alkoxy group include a methoxy group, an ethoxy group, a propyloxy group, a pentyloxy group, a hexyloxy group, an octyloxy group, and a dodecyloxy group.

Specific examples of the compounds represented by Formula (1), according to the present invention, will now be cited, however, the present invention is not limited thereto.

1-1

1-2

1-3

1-4

1-5

Secondly, the compounds represented by Formula (2), according to the present invention, will now be described.

In above Formula (2), each of $R_5$ and $R_6$ represents a hydrogen atom, an alkyl group, an alkenyl group, an aryl group, a cycloalkyl group, an alkoxyalkyl group, or an alkoxy group.

Examples of the alkyl group include a methyl group, an ethyl group, a propyl group, an isopropyl group, a tert-butyl group, a pentyl group, a hexyl group, an octyl group, a dodecyl group, a tridecyl group, a tetradecyl group, and a pentadecyl group, while examples of the aryl group include a phenyl group, and a naphthyl group, while examples of the cycloalkyl stoup include a cyclopentyl group, and a cyclohexyl group. Examples of the alkoxyalkyl group include a β-methoxymethyl group, a γ-methoxypropyl group, while examples of the alkoxy group include a methoxy group, an ethoxy group, a propyloxy group, a pentyloxy group, a hexyloxy group, an octyloxy group, and a dodecyloxy group.

Specific examples of the compounds represented by Formula (2) according to the present invention will now be listed, however the presented invention is not limited thereto.

Of the compounds represented by above exemplified Formulas (1) and (2), specifically preferred are Exemplified Compounds (1-1), (1-2), and (2-3).

The compounds represented by Formulas (1) and (2), according to the present invention, belong to one type of electrolyte solvents. In the display element of the present invention, another solvent may simultaneously be employed so that the purpose and effects of the present invention are not adversely affected. Specifically listed are tetramethylurea, sulfolane, dimethylsulfoxide, 1,3-dimethyl-2-imidazolidinone, 2-(N-methyl)-2-pyrrolidinone, hexamethylphosphortriamide, N-methylpropionamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxyethane, diethoxyfuran, tetrahydrofuran, ethylene glycol, diethylene glycol, triethylene glycol monobutyl ether, and water. It is preferable to include at least one type of solvent of a freezing point of at most −20° C. and a boiling point of at least 120° C. among these solvents.

Further listed as usable solvents in the present invention may be the compounds described in J. A. Riddick, W. B. Bunger, T. K. Sakano, "Organic Solvents", 4th ed., John Wiley & Sons (1986), Y. Marcus, "Ion Solvation", John Wiley & Sons (1985), C. Reichard, "Solvents and Solvent Effects in Chemistry", 2nd ed., VCH (1988), G. J. Janz, R. P. T. Tomkins, "Nonaqueous Electrolytes Handbook", Vol. 1, Academic Press (1972).

In the present invention, the electrolyte solvent may be a single variety or a solvent mixture. However preferred is a solvent mixture containing ethylene carbonate. The added amount of ethylene carbonate is preferably 10-90% by weight with respect to the total electrolyte solvent weight. The specifically preferred electrolyte solvent is the solvent mixture of propylene carbonate/ethylene carbonate at a weight ratio of 7/3-3/7. When the ratio of propylene carbonate is more than 7/3, the response rate is lowered due to degradation of ionic conductivity, while when it is less than 3/7, electrolytes tend to deposit at low temperature.

In the display element of the present invention, it is preferable to employ the compound represented by above Formula (1) or (2) together with the compound represented by above Formula (3).

In above Formula (3), $R_7$ and $R_8$ each represent a substituted or unsubstituted hydrocarbon group, which includes an aromatic straight chain group or branched chain group. Further, these hydrocarbon groups may contain at least one of a nitrogen atom, an oxygen atom, a phosphorous atom, a sulfur atom, and a halogen atom. However, when a ring containing an S atom is formed, no aromatic group is employed. The atom adjacent to the S atom of $R_7$ and $R_8$ is not S.

Listed as a substitutable group to the hydrocarbon group may, for example, be an amino group, a guanidino group, a quaternary ammonium group, a hydroxyl group, a halogen compound, a carboxyl group, a carboxylate group, an amido group, a sulfinic acid group, a sulfonic acid group, a sulfate group, a phosphonic acid group, a phosphate group, a nitro group, and a cyano group.

It is commonly necessary to have silver solubilized in an electrolyte in order to result in dissolution and deposition of silver. Namely, it is common to employ a method in which silver or silver-containing compound is modified to be soluble compound via coexistence of a compound containing chemical structure species which result in mutual interaction with silver, which forms a coordination bond with silver or forms a weak covalent bond with silver. Known as the above chemical structure species are a halogen atom, a mercapto group, a carboxyl group, an imino group and so on. In the present invention, a thioether group also usefully acts as a silver solvent and exhibits features such as minimal effects to coexisting compounds and high solubility in solvents.

Specific examples of the compounds represented by Formula (3) according to the present invention will now be cited, however the present invention is not limited to the exemplified compounds.

3-1: $CH_3SCH_2CH_2OH$
3-2: $HOCH_2CH_2SCH_2CH_2OH$
3-3: $HOCH_2CH_2SCH_2CH_2SCH_2CH_2OH$
3-4: $HOCH_2CH_2SCH_2CH_2SCH_2CH_2SCH_2CH_2OH$
3-5: $HOCH_2CH_2SCH_2CH_2OCH_2CH_2OCH_2CH_2SCH_2CH_2OH$
3-6: $HOCH_2CH_2OCH_2CH_2SCH_2CH_2SCH_2CH_2OCH_2CH_2OH$
3-7: $H_3CSCH_2CH_2COOH$
3-8: $HOOCCH_2SCH_2COOH$
3-9: $HOOCCH_2CH_2SCH_2CH_2COOH$
3-10: $HOOCCH_2SCH_2CH_2SCH_2COOH$
3-11: $HOOCCH_2SCH_2CH_2SCH_2CH_2SCH_2CH_2SCH_2COOH$
3-12: $HOOCCH_2CH_2SCH_2CH_2SCH(OH)CH_2SCH_2CH_2SCH_2CH_2COOH$
3-13: $HOOCCH_2CH_2SCH_2CH_2SCH(OH)CH(OH)CH_2SCH_2CH_2SCH_2CH_2COOH$
3-14: $H_3CSCH_2CH_2CH_2NH_2$
3-15: $H_2NCH_2CH_2SCH_2CH_2NH_2$
3-16: $H_2NCH_2CH_2SCH_2CH_2SCH_2CH_2NH_2$
3-17: $H_3CSCH_2CH_2CH(NH_2)COOH$
3-18: $H_2NCH_2CH_2OCH_2CH_2SCH_2CH_2SCH_2CH_2OCH_2CH_2NH_2$ 3-19: H$_2$NCH$_2$CH$_2$SCH$_2$CH$_2$OCH$_2$CCH$_2$OCH$_2$CH$_2$SCH$_2$CH$_2$NH$_2$ 3-20: H$_2$NCH$_2$CH$_2$SCH$_2$CH$_2$SCH$_2$CH$_2$SCH$_2$CH$_2$SCH$_2$CH$_2$NH$_2$ 3-21: HOOC(NH$_2$)CH$_2$CH$_2$CH$_2$SCH$_2$CH$_2$SCH$_2$CH$_2$CH(NH$_2$)COOH 3-22: HOOC(NH$_2$)CHCH$_2$SCH$_2$CH$_2$OCH$_2$CH$_2$OCH$_2$CH$_2$SCH$_2$CH(NH$_2$)COOH 3-23: HOOC(NH$_2$)CHCH$_2$OCH$_2$CH$_2$SCH$_2$CH$_2$SCH$_2$CH$_2$OCH$_2$CH(NH$_2$)COOH 3-24: H$_2$N(=O)CCH$_2$SCH$_2$CH$_2$OCH$_2$CH$_2$OCH$_2$CH$_2$SCH$_2$C(=O)NH$_2$ 3-25: H$_2$N(O=)CCH$_2$SCH$_2$CH$_2$SCH$_2$C(O=)NH$_2$ 3-26: H$_2$NHN(O=)CCH$_2$SCH$_2$CH$_2$SCH$_2$C(O=)NHNH$_2$ 3-27: H$_3$(O=)NHCH$_2$CH$_2$SCH$_2$CH$_2$SCH$_2$CH$_2$NHC(O=)CH$_2$ 3-28: H$_2$NO$_2$CH$_2$CH$_2$SCH$_2$CH$_2$SCH$_2$CH$_2$SO$_2$NH$_2$ 3-29: NaO$_3$SCH$_2$CH$_2$CH$_2$SCH$_2$CH$_2$SCH$_2$CH$_2$SO$_3$Na

3-30: H$_3$CSO$_2$NHCH$_2$CH$_2$SCH$_2$CH$_2$SCH$_2$CH$_2$NHO$_2$SCH$_3$ 3-31: H$_2$N(NH)CSCH$_2$CH$_2$SC(NH)NH$_2$.2HBr 3-32: H$_2$N(NH)CSCH$_2$CH$_2$OCH$_2$CH$_2$OCH$_2$CH$_2$SC(NH)NH$_2$.2HCl 3-33: H$_2$N(NH)CNHCH$_2$CH$_2$SCH$_2$CH$_2$SCH$_2$CH$_2$NHC(NH)NH$_2$.2HBr 3-34: [(CH$_3$)$_3$NCH$_2$CH$_2$SCH$_2$CH$_2$SCH$_2$CH$_2$N(CH$_3$)$_3$]$^{2+}$.2Cl$^-$ 3-35

3-36

3-37

3-38

3-39

3-40

3-41

3-42

3-43

3-44

3-45

3-46

3-47

Of the above exemplified compounds Compound 3-2 is specifically preferred in view of realizing the purposes and effects of the present invention.

The compounds represented by Formula (4) according to the present invention will now be described.

In above Formula (4), M represents a hydrogen atom or quaternary ammonium; Z represents a nitrogen-containing heterocyclic ring except for imidazole rings; n represents an integer of 0-5; R4 represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group, or a heterocyclyl group. When n represent at least 2, each R4 may be the same or different, and may be joined to form a condensed ring.

Examples of metal atoms represented by M of Formula (4) include Li, Na, K, Mg, Ca, Zn, and Ag, while examples of quaternary ammonium include $NH_4$, $N(CH_3)_4$, $N(C_4H_9)_4$, $N(CH_3)_3C_{12}H_{25}$, $N(CH_3)_3C_{16}H_{33}$, and $N(CH_3)_3CH_2C_6H_5$.

Examples of the nitrogen-containing heterocyclic rings represented by Z of Formula (4) include a tetrazole ring, a triazole ring, an imidazole ring, an oxadiazole ring, a thiadiazole ring, an indole ring, an oxazole ring, a benzoxazole ring, a benzimidazole ring, a benzothiazole ring, a benzoselenazole ring, and a naphthoxazole ring.

Examples of the halogen atoms represented by $R_4$ of Formula (4) include a fluorine atom, a chlorine atom, a bromine atom and a iodine atom; examples of the alkyl groups include a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group; examples of the aryl group include a phenyl group and a naphthyl group; examples of the alkylcarbonamido group include an acetylamino group, a propionylamino group, and a butyroylamino group; examples of the arylcarbonamido group include a benzoylamino group; examples of the alkylsulfonamido group include a methanesulfonylamino group and an ethanesulfonylamino group; examples of the arylsulfonamido group represented by the same include a benzenesulfonylamino group and a toluenesulfonylamino group; examples of the aryloxy group include a phenoxy group; examples of the alkylthio group include a methylthio group, an ethylthio group, and a butylthio group; examples of the arylthio group include a phenylthio group and a tolylthio group; examples of the alkylcarbamoyl group include a methylcarbamoyl group, a dimethylcarbamoyl group, an ethylcarbamoyl group, a diethylcarbamoyl group, a dibutylcarbamoyl group, a piperidylcarbamoyl group, and a morphorylcarbamoyl group; examples of the arylcarbamoyl group include a phenylcarbamoyl group, a methylphenylcarbamoyl group, an ethylphenylcarbamoyl group, and a benzylphenylcarbamoyl group; examples of the alkylsulfamoyl group include a methylsulfamoyl group, a dimethylsulfamoyl group, an ethylsulfamoyl group, a dimethylsulfamoyl group, a dibutylsulfamoyl group, a piperidylsulfamoyl group, and a morphorylsulfamoyl group; examples of the arylsulfamoyl group include a phenylsulfamoyl group, a methylsulfamoyl group, an ethylphenylsulfamoyl group, and a benzylphenylsulfamoyl group; examples of the alkylsulfonyl group include a methanesulfonyl group and an ethanesulfonyl group; examples of the arylsulfonyl group include a phenylsulfonyl group, a 4-chlorophenylsulfonyl group, and a p-toluenesulfonyl group; examples of the alkoxycarbonyl group include a methoxycarbonyl group, an ethoxycarbonyl group, and a butoxycarbonyl group; examples of the aryloxycarbonyl group include a phenoxycarbonyl group; examples of the alkylcarbonyl group include an acetyl group, a propionyl group, and a butyroyl group; examples of the arylcarbonyl group include a benzoyl group and an alkylbenzoyl group; examples of the acyloxy group include an acetyloxy group, a propionyloxy group, and a butyroyloxy group; examples of the heterocyclyl group include an oxazole ring, a thiazole ring, a triazole ring, a selenazole ring, a tetrazole ring, an oxadiazole ring, a thiadiazole ring, a thiazine ring, a triazine ring, a benzoxazole ring, a benzothiazole ring, an indolenine ring, a benzoselenazole ring, a naphthothiazole ring, a triazaindolizine ring, a diazaindolizine ring, and a tetraazaindolizine ring. These substituents include those which have a substituent.

Specific examples of the preferred compounds represented by Formula (4) will now be cited, however the present invention is not limited thereto.

-continued 4-9
4-10
4-11
4-12
4-13
4-14
4-15
4-16
4-17

-continued 4-18
4-19

Of the compounds exemplified as above, in view of satisfactorily realizing the objects and effects of the present invention, specifically preferred are Exemplified Compounds 4-12 and 4-18.

(Concentration Ratio of Halogen Ion and Silver Ion)

In the display element of the present invention, it is preferable to satisfy the conditions specified by following Formula (1):

$$0 \leq [X]/[Ag] \leq 0.01 \qquad \text{Formula (1)}$$

wherein [X] represents mol concentration (mol/kg) of halogen ions or halogen atoms contained in the electrolyte, and [Ag] represents total mol concentration (mol/kg) of silver or compounds containing silver in the chemical structure, contained in the above electrolyte.

Halogen atoms, as described in the present invention refer to any of the iodine, chloride, bromine, and fluorine atoms. When [X]/[Ag] is at least 0.01, during oxidation-reduction reaction of silver, $X^- \rightarrow X_2$ occurs. This reaction becomes one of the factors in which $X_2$ easily undergoes cross oxidation with blackened silver to dissolve blackened silver, resulting in a decrease in memory capability. Consequently, it is preferable that the mol concentration of halogen atoms is as low as possible with respect to the mol concentration of silver. In the present invention, $0 \leq [X]/[Ag] \leq 0.001$ is more preferred. When halogen ions are added, in view of enhancement of memory capability, the sum of mol concentration of each of the halogen species is [I]<[Br]<[Cl]<[F].

(Electrolyte—Silver Salt)

In the display element of the present invention, employed may be known silver compounds such as silver iodide, silver chloride, silver bromide, silver oxide, silver sulfide, silver citrate, silver acetate, silver behenate, silver p-toluenesulfonate, silver salts of mercapto compounds, and silver complexes of iminodiacetic acids. Of these, it is preferable to employ silver salts which have no nitrogen atom exhibiting coordination capability with halogen, carboxylic acid, and silver, and for example, preferred is silver p-toluenesulfonate.

Silver ion concentration in the electrolyte according to the present invention is preferably 0.2 mol/kg <[Ag]<2.0 mol/kg. When the silver ion concentration is at most 0.2 mol/kg, a diluted silver solution is formed to lower the driving rate, while when it exceeds 2 mol/kg, solubility is degraded to tend to result in inconvenience of deposition during storage at low temperature.

(Electrolyte Materials)

In the display element of the present invention the electrolyte may contain the following compounds when the electrolyte is liquid. Listed as potassium compounds are KCl, KI, and KBr, as lithium compounds are $LiBF_4$, $LiClO_4$, $LiPF_6$, and $LiCF_3SO_3$, and as tetraalkylammonium compounds are tetraethylammonium perchlorate, tetrabutylammonium perchlorate, tetraethylammonium borofluoride, tetrabutylammonium borofluoride, and tetrabutylammonium halide. Further, it is possible to preferably employ a molten salt electrolytic composition described in Paragraphs [0062]-[0081] of JP-A No. 2003-187881. Further, it is possible to employ compound, which becomes an oxidation-reduction pair such as $I^-/I_3^-$, $Br^-/Br_3^-$, or quinone/hydroquinone.

Further, the electrolyte may contain the following compounds exhibiting electronic conductivity and ionic conductivity, when a supporting electrolyte is solid.

Such compounds include a vinyl fluoride based polymer containing perfluorosulfonic acid, polythiophene, polyaniline, polypyrrole, triphenylamines, polyvinyl carbazoles, polymethylphenylsilanes, chalcogenides such as $Cu_2S$, $Ag_2S$, $Cu_2Se$, or $AgCrSe_2$, fluorine-containing compounds such as $CaF_2$, $PbF_2$, $SrF_3$, $LaF_3$, $TlSn_2F_5$, or $CeF_3$, Li salts such as $Li_2SO_4$, $Li_4SiO_4$, or $Li_3PO_4$, $ZrO_2$, $CaO$, $Cd_2O_3$, $HfO_2$, $Y_2O_3$, $Nb_2O_5$, $WO_3$, $Bi_2O_3$, AgBr, AgI, CuCl, CuBr, CuI, LiI, LiBr, LiCl, $LiAlCl_4$, $LiAlF_4$, $AgSBr$, $C_5H_5NHAg_5I_6$, $Rb_4Cu_{16}I_7Cl_{13}$, $Rb_3Cu_7Cl_{10}$, LiN, $Li_5NI_2$ and $Li_6NBr_3$.

Further, it is possible to employ a gel-like electrolyte as a supporting electrolyte. When the electrolyte is non-aqueous, it is possible to employ oil gelling agents described in Paragraphs [0057]-[0059] of JP-A No. 11-185836.

(Thickener Added to Electrolyte)

In the display element of the present invention, along with a polysaccharide thickener according to the present invention, it is possible to simultaneously employ a thickener known in the art as for as the objects and effects of the present invention are not adversely affected. Examples thereof include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals), for example, poly(vinyl formal and poly(vinyl butyral), poly(esters), poly(urethanes), phenoxy resins, poly (vinylidene chloride), poly(epoxides), poly(carbonates), poly (vinyl acetate), cellulose esters, poly(amides). Hydrophobic transparent binders include polyvinyl butyral, cellulose acetate, cellulose acetate butyrate, polyester, polycarbonate, polyacrylic acid, and polyurethane.

These thickeners may be employed in combinations of at least two types. Further listed may be the compounds described on pages 71-75 of JP-A No. 64-13546. In view of enhancement of compatibility with various additives and dispersion stability of white particles, of these, preferably employed compounds include polyvinyl alcohols, polyvinylpyrrolidones, hydroxypropyl celluloses, and polyalkylene glycols.

(Other Additives)

Constituting layers of the display element of the present invention may include subsidiary layers such as a protective layer, a filter layer, an antihalation layer, a cross-over light cutting layer, or a backing layer. If desired, may be incorporated in these subsidiary layers are various types of chemical sensitizers, noble metal sensitizers, sensitizing dyes, supersensitizing dyes, couplers, high-boiling point solvents, antifoggants, stabilizers, development restrainers, bleach accelerators fixing accelerators, color mixing inhibitors, formalin scavengers, toning agents, hardeners, surface active agents, thickeners, plasticizers, lubricants, UV absorbers, anti-irradiation dyes, filter light absorbing dyes, fungicides, polymer latexes, heavy metals, antistatic agents, and matting agents.

These additives, described above, are detailed in Research Disclosure (hereinafter referred to as RD), Volume 176 Item/17643 (December 1978), Volume 184 Item/18431 (August 1979), Volume 187 Item/18716 (November 1979), and Volume 308. Item/308119 (December 1989).

Types and listed positions of the compounds cited in these three Research Disclosures are described below.

| Additive | RD 17643 Page &Class | RD 18716 Page &Class | RD 308119 Page &Class |
|---|---|---|---|
| Chemical Sensitizer | 23 III | 648 upper right | 96 III |
| Sensitizing Dye | 23 IV | 648-649 | 996-8 IV |
| Desensitizing Dye | 23 IV | | 998 IV |
| Dye | 25-26 VIII | 649-650 | 1003 VIII |
| Development Accelerator | 29 XXI | 648 upper right | |
| Antifoggant, Stabilizer | 24 IV | 649 upper right | 1006-7 VI |
| Whitening Agent | 24 V | | 998 V |
| Hardener | 26 X | 651 upper left | 1004-5 X |
| Surface Active Agent | 26-7 XI | 650 right | 1005-6 XI |
| Antistatic Agent | 27 XII | 650 right | 1006-7 XIII |
| Plasticizer | 27 XII | 650 right | 1006 XII |
| Lubricant | 27 XII | | |
| Matting Agent | 28 XVI | 650 right | 1008-9 XVI |
| Binder | 26 XXII | | 1003-4 IX |
| Support | 28 XVII | | 1009 XVII |

(Layer Configuration)

Constitution layers between the counter electrodes of the display element of the present invention will further be described.

As the constitution layer related to the display element of the present invention, it is possible to provide a constitution layer containing a positive hole transporting material. Examples of positive hole transporting materials include aromatic amines, triphenylene derivatives, oligothiophene compounds, polypyrroles, polyacetylene derivatives, polyphenylene vinylene derivatives, polythienylene vinylene derivatives, polythiophene derivatives, polyaniline derivatives, polytoluidine derivatives, CuI, CuSCn, $CuInSe_2$, Cu(In, Ga)Se, $CuGaSe_2$, $Cu_2O$, CuS, $CuGaS_2$, $CuInS_2$, GaP, NiO, CoO, FeO, $Bi_2O_3$, $MoO_2$, and $Cr_2O_3$.

(Substrates)

Preferably employed as substrates usable in the present invention may be synthetic plastic films composed, for example, of polyolefins such as polyethylene or polypropylene, polycarbonates, cellulose acetate, polyethylene terephthalate, polyethylenedinaphthalene dicarboxylate, polyethylene naphthalates, polyvinyl chloride, polyimide, polyvinyl acetals, or polystyrene. Further, preferred are syndiotactic-structured polystyrenes. It is possible to prepare these employing the methods described, for example, in JP-A Nos. 62-117708, 1-46912, and 1-178505. Further listed are metal substrates of stainless steel, paper supports such as baryta paper or resin-coated paper, supports composed of the above plastic film having thereon a reflection layer, and those described, as a support, in JP-A No. 62-253195 (pages 29-31). It is possible to preferably employ those described on page 28 of RD No. 17643, from the light column on page 647 to the left column on page 648 of RD No. 18716, and on page 879 of RD No. 307105. As described in U.S. Pat. No. 4,151,735, these supports may be subjected to a thermal treatment at a temperature below Tg so that core-set curl is minimized. Further, the surface of these supports may be subjected to a surface treatment with the aim of enhancement of adhesion of the support to another constitution layer. In the present invention employed as a surface treatment may be a glow discharge treatment, an ultraviolet radiation treatment, a corona treatment, and a flame treatment. Further employed may be supports described on pages 44-149 of Kochi Gijutsu (Known Technology) No. 5 (published by AZTEC Japan., Mar. 22, 1991). Further listed are those described on page 1009 of RD No. 308119, as well as in the item "Supports" on page 108 of Product Licensing Index Volume 92. Other than the above, employed may be glass substrates and epoxy resins kneaded with glass powder.

(Electrode)

In the display element of the present invention, it is preferable that at least one of the counter electrodes is a metal electrode. Employed as a metal electrode may be metals such as platinum, gold, silver, copper aluminum, zinc, nickel, titanium, or bismuth, as well as alloys thereof, which are known in the art. Preferred metals employed in the metal electrodes are those which exhibit a work function near the oxidation-reduction potential of silver in the electrolyte. Of these, a silver electrode or an electrode composed of silver in an amount of at least 80% is advantageous to maintain reduced silver, and further, results in anti-staining of electrodes. Employed as a method to prepare the electrodes may be conventional ones such as a vacuum evaporation method, a printing method, an ink-jet printing method, a spin coating method, or a CVD method.

Further, it is preferable that in the display element of the present invention, at least one of the counter electrodes is transparent. Transparent electrodes are not particularly limited as long as they are transparent and electrically conductive. Examples thereof include indium tin oxide (ITO), indium zinc oxide (IZO), fluorine-doped tin oxide (FTO), indium oxide, zinc oxide, platinum, gold, silver, rhodium, copper, chromium, carbon, aluminum, silicon, amorphous silicon, and BSO (bismuth silicon oxide). In order to form electrodes, as described above, for example, an ITO layer may be subjected to mask evaporation on a substrate employing a sputtering method, or after forming an ITO layer on the entire surface, patterning may be performed employing photolithography. The surface resistance value is preferably at most 100Ω/□, but is more preferably at most 10Ω/□. The thickness of the transparent electrode is not particularly limited, but is commonly 0.1-20 μm.

(Other Constituting Components of Display Element)

If desired, employed in the display element of the present invention may be sealing agents, columnar materials, and spacer particles.

Sealing agents are those which perform sealing so that leak to the exterior is minimized, and are called sealants. Employed as sealing agents may be heat curing, light curing, moisture curing, and anaerobic during type resins such as epoxy resins, urethane based resins, acryl based resins, vinyl acetate based resins, en-thiol based resins, silicone based resins, or modified polymer resins.

Columnar materials provide a strong self-supporting capability (strength) between substrates. For example, listed may be a cylindrical form, a quadrangular form, an elliptic from, and a trapezoidal form which are arranged at definite intervals in a specified pattern such as a lattice. Further employed may be stripe-shaped ones arranged at definite intervals. It is preferable that the columnar materials are not randomly arranged but arranged at an equal distance so that the interval gradually varies, or a predetermined pattern is repeated at a definite cycle so that the distance between substrates is nearly maintained and image display is not degraded. When the columnar materials are such that the ratio of the area occupied by the display region of a display element is 1-40%, sufficient strength as a display element for commercial viability is obtained.

In order to maintain a uniform gap between paired substrates, provided between them may be spacers. As such spacers, exemplified may be spheres composed of resins or inorganic oxides. Further suitably employed are adhesion spacers, the surface of which is coated with thermoplastic resins. In order to maintain a uniform gap between substrates, provide only may be columnar materials. However, both spacers and columnar materials may be provided. Instead of the columnar materials, only spacers may be employed as space-maintaining members. The diameter of spacers, when a columnar material is formed, is at most its height, but is preferably equal to the above height. When no columnar material is formed, the diameter of spacers corresponds to the thickness of the cell gap.

(Screen Printing)

In the present invention, it is possible to form sealing agents, columnar materials, and electrode patterns, employing a screen printing method. In screen printing methods, a screen, on which predetermined patterns are formed, is applied onto the electrode surface, and printing materials (compositions to form columnar materials such as light-curing resins) are placed on the screen. Subsequently, a squeegee is moved at a predetermined pressure, angle and rate. By such action, the printing materials are transferred onto the above substrate via the pattern of the screen. Subsequently, the transferred materials are thermally cured and dried. When columnar materials are formed employing the screen printing method, resinous materials are not limited to light-curing resins, but also employed, for example, may be heat curable resins such as epoxy resins or acryl resins, as well as thermoplastic resins. Listed as thermoplastic resins are: polyvinyl chloride resins, polyvinylidene chloride resins, polyvinyl acetate resins, polymethacrylic acid ester resins, polyacrylic acid ester resins, polystyrene resins, polyamide resins, polyethylene resins, polypropylene resins, fluororesins, polyurethane resins, polyacrylonitrile resins, polyvinyl ether resins, polyvinyl ketone resins, polyether resins, polyvinylpyrrolidone resins, saturated polyester resins, polycarbonate resins, and chlorinated polyether resins. It is preferable that resinous materials are employed in the form of a paste, while dissolved in suitable solvents.

As noted above, after forming the columnar materials on the substrate, if desired, a spacer is provided on at least one side of the substrate, and paired substrates are placed so that the electrode forming surfaces face each other, whereby a vacant cell is formed. By heating the paired facing substrates, under application of pressure from both sides, they are adhered to each other, whereby a display cell is obtained. Preparation of a display element may be achieved by injecting an electrolyte composition between the substrates, employing a vacuum injection method. Alternatively, during adhesion of the substrates, an electrolyte composition may be dripped onto the surface of one of the substrates and then an electrolyte composition is injected simultaneously sealed when the substrates are adhered to each other.

(Method to Drive Display Element)

In the display element of the present invention, it is preferable to drive a display element so that blackened silver is deposited via voltage application of at least deposition overvoltage and deposition of blackened silver is allowed to continue via application of voltage lower than the deposition overvoltage. By performing the above driving operation, it is possible to lower energy for writing, decrease the driving circuit load, as well as to enhance writing rate. It is common knowledge that during the electrode reaction in the electrochemical field, overvoltage exists. Overvoltage is detailed, for example, on page 121 of "Denshi Ido no Kagaku—Denkikagaku Nyumon (Chemistry of Electron Transfer—Introduction to Electrochemistry)" (1996, published by Asakura Shoten). It is possible to consider that the display element of the present invention undergoes an electrode reaction of an electrode with silver in the electrolyte. Consequently, it easy to understand the presence of overvoltage during silver dissolution and deposition. Since the magnitude of overvoltage is controlled by exchange current density, it is assumed that the fact that as shown in the present invention, after formation of blackened silver, deposition of blackened silver continues via application of voltage lower than the deposition overvoltage, is that the surface of the blackened silver results in less excessive electric energy, whereby it is possible to easily perform electron injection.

Driving operation of the display element of the present invention may be simple matrix driving or active matrix driving. Simple matrix driving, as described in the present invention, refers to the driving method in which electric current is sequentially applied to a circuit in which a positive electrode line containing a plurality of positive electrodes faces a negative electrode line containing a plurality of negative electrodes so that each line intersects in the perpendicular direction. By employing simple matrix driving, it is possible to simplify the circuit structure and the driving IC, resulting in advantages such as lower production cost. Active matrix driving refers to a system in which scanning lines, data lines, and current feeding lines are formed in a checkered pattern and driving is performed by TFT circuits arranged in each of the squares of the checkered pattern. Since it is possible to switch for each pixel, advantages result in gradation as well as memory function. For example, it is possible to employ the circuit described in FIG. 5 of JP-A No. 2004-29327.

(Applied Products)

It is possible to apply the display element of the present invention to electronic book related fields, ID card related fields, public information related fields, transportation related fields, broadcasting related fields, account settling fields, and distribution and logistics related fields. Specific examples include door keys, student identification cards, employee ID cards, various club membership cards, convenience store cards, department store cards, vending machine cards, gas station cards, subway and railroad cards, bus cards, cash cards, credit cards, highway cards, driver licenses, hospital medical examination cards, health insurance cards, Basic Resident Registers, passports, and electronic books.

EXAMPLES

The present invention will now be described with reference to examples, but is not limited thereto. In examples, "parts" and "%" are parts by weight and % by weight, respectively, unless otherwise specified.

<<Preparation of Display Elements>>

(Preparation of Display Element 1)

(Preparation of Electrolyte 1)

Added to and completely dissolved in 2.5 g of dimethyl sulfoxide were 90 mg of sodium iodide and 75 mg of silver iodide. Thereafter, added was 150 mg of polyvinylpyrrolidone (of an average molecular weight of 15,000), and the resulting mixture was heated at 120° C. while stirring, whereby Electrolyte 1 was prepared.

(Preparation of Transparent Electrode)

A tin-doped indium oxide film (also referred to as an ITO film) of a pitch of 145 μm and an electrode width of 130 μm was formed on a glass substrate of a thickness of 1.5 mm and a width of 2 cm×4 cm, employing known method, whereby a transparent electrode (Electrode 1) was prepared.

(Preparation of Metal Electrode)

A silver-palladium electrode (Electrode 2) of a thickness of 0.8 μm, a pitch of 145 μm, and an electrode distance of 130 μm was prepared on a glass substrate of a thickness of 1.5 mm and a width of 2 cm×4 cm.

(Formation of White Scattering Layer 1)

An aqueous mixture prepared by dispersing 20% by weight of titanium oxide in a 2% by weight aqueous gelatin solution, employing a homogenizer, was applied onto above Electrode 2 bordered by an olefin based sealing agent containing glass spherical beads of an average particle diameter of 70 μm at a volume ratio of 10%, to realize a wet layer thickness of 100 μm, employing a wire bar, and subsequently dried at 15° C. for 30 minutes. After evaporating water, drying was conducted at 45° C. for one hour, whereby Electrode-Attached White Scattering Layer 1 was formed.

(Preparation of Display Element)

Electrolyte 1, prepared as above, was provided onto White Scattering Layer 1 formed on Electrode 2 and subsequently was allowed to stand for 30 minutes so that Electrolyte 1 was sufficiently penetrated into White Scattering Layer 1 without inclusion of air bubbles. Thereafter, the resulting layer was covered with Electrode 1 followed by heating and pressing, whereby Display Element 1 was prepared.

(Preparation of Display Elements 2-9)

Each of Display Elements 2-9 was prepared in the same manner as above Display Element 1, except that White Light Scattering Layer was replaced with each of following White Scattering Layers 2-9.

(White Scattering Layer 2)

White Scattering Layer 2 was formed in the same manner as above White Scattering Layer 1, except that gelatin was replaced with polyvinyl alcohol (at a degree of polymerization of 4500 and a saponification ratio of 87-89%).

(White Scattering Layer 3)

White Scattering Layer 3 was formed in the same manner as above White Scattering Layer 1, except that gelatin was replaced with water-dispersible and thermally curable acrylic resin (FC102, produced by Sakata Ink Corp.).

(White Scattering Layer 4)

White Scattering Layer 4 was formed in the same manner as above White Scattering Layer 1, except that gelatin was replaced with water-dispersible and thermally curable urethane resin (SUPERFLEX 150, produced by Dai-Ichi Kogyo Seiyaku Co., Ltd.).

(White Scattering Layer 5)

White Scattering Layer 5 was formed in the same manner as above White Scattering Layer 1, except that gellangum (produced by Wako Pure Chemical Industries, Ltd.) was added in an amount of 10% by weight with respect to the water based polymers.

(Preparation of White Scattering Layers 6-9)

White Scattering Layers 6-9 were formed in the same manner as above White Scattering Layers 1-4, except that carageenan (produced by Wako Pure Chemical Industries, Ltd.) was added in an amount of 10% by weight with respect to the aqueous polymers.

(Preparation of Display Elements 10-15)

Each of Display Elements 10-15 was prepared in the same manner as above Display Element 6, except that Electrolyte 1 was replaced with each of Electrolytes 2-7 prepared by the following method.

(Preparation of Electrolyte 2)

Added to and completely dissolved in 2.5 g of propylene carbonate/ethylene carbonate (at a weight ratio of 7/3 were 100 mg of silver p-toluenesulfonate, 150 mg of 3,6-dithia-1,8-ontanediol and 1 mg of mercaptotriazole. Thereafter, added to the resulting solution was 150 mg of polyethylene glycol (of an average molecular weight of 500,000). While stirring, the resulting mixture was maintained at 120° C. for one hour, whereby Electrolyte 2 was prepared.

(Preparation of Electrolyte 3)

Electrolyte 3 was prepared in the same manner as above Electrolyte 2, except that propylene carbonate/ethylene carbonate was replaced with dimethylsulfoxide.

(Preparation of Electrolyte 4)

Electrolyte 4 was prepared in the same manner as above Electrolyte 3, except that 3,6-dithia-1,8-octanediol was removed and 300 mg of mercaptotriazole was added.

(Preparation of Electrolyte 5)

Electrolyte 5 was prepared in the same manner as above Electrolyte 3, except that mercaptotriazole was removed.

(Preparation of Electrolyte 6)

Electrolyte 6 was prepared in the same manner as above Electrolyte 2, except that silver p-toluenesulfonate was replaced with silver bromide.

(Preparation of Electrolyte 7)

Electrolyte 7 was prepared in the same manner as above Electrolyte 2, except that silver p-toluenesulfonate was replaced with silver chloride.

<<Evaluation of Display Elements: Image Mottle Resistance>>

Initially, diving conditions were determined so that the reflectance of each display element, prepared as above, resulted in 10% at 550 nm which was determined by spectral calorimeter CM-3700d, produced by Konica Minolta Sensing, Inc. Subsequently, under the resulting driving conditions, each display element was blackened, and the resulting blackened image of a 10-pixel square was captured via a CCD camera, whereby BGR image information of each pixel was obtained. Subsequently, the reflectance of each pixel was calculated based on the measurement table of reflectance measurement values of CM-3700d which had separately been obtained and RGB image information. Subsequently, reflectance difference in the display element=maximal reflectance−minimal reflectance was obtained, and the resulting value was normalized so that reflectance difference of Display Element 1 was 100, and the resulting normalized value was employed as a scale of image mottle. A decrease in value was employed as a scale of image mottle is desirably decreased.

Table 1 shows the results.

TABLE 1

| Display Element No. | Image Mottle Resistance Relative Value*1 | Remarks |
| --- | --- | --- |
| 1 | 100 | Comparative Example |
| 2 | 94 | Comparative Example |
| 3 | 122 | Comparative Example |
| 4 | 111 | Comparative Example |
| 5 | 83 | Present Invention |
| 6 | 67 | Present Invention |
| 7 | 61 | Present Invention |
| 8 | 78 | Present Invention |
| 9 | 67 | Present Invention |
| 10 | 11 | Present Invention |
| 11 | 26 | Present Invention |
| 12 | 39 | Present Invention |
| 13 | 39 | Present Invention |
| 14 | 56 | Present Invention |
| 15 | 50 | Present Invention |

Relative Value*1: normalized under Display Element 1 = 100

As can clearly be seen from the results listed in Table 1, the display elements, structured as specified in the present invention, exhibited excellent image mottle resistance and produce highly uniform images, compared to Comparative Examples.

The invention claimed is:

1. A display element comprising a couple of electrodes, an electrolyte containing silver or a compound containing silver in a chemical structure, a porous white scattering material containing titanium oxide and an aqueous polymer binding the titanium oxide, and a polysaccharide thickener, between the electrodes;
    wherein the porous white scattering material has been formed by applying an aqueous mixture containing titanium oxide, an aqueous polymer binding the titanium oxide, and a polysaccharide thickener onto at least one of the electrodes and subsequently dried.

2. The display element of claim 1, wherein an average diameter of the primary particles of the titanium oxide is 0.2 to 0.7 μm.

3. The display element of claim 1, wherein the polysaccharide thickener is carrageenan.

4. The display element of claim 1, wherein the electrolyte contains at least one of compounds represented by following Formula (1) or (2), and at least one of compounds represented by following Formula (3) or (4), Formula (1)

wherein L represents an oxygen atom or CH$_2$, and each of R$_1$-R$_4$ represents a hydrogen atom, an alkyl group, an alkenyl group, an aryl group, a cycloalkyl group, an alkoxyalkyl group, or an alkoxy group,

Formula (2)

wherein each of R$_5$ and R$_6$ represents a hydrogen atom, an alkyl group, an alkenyl group, an aryl group, a cycloalkyl group, an alkoxyalkyl group, or an alkoxy group, Formula (3)

wherein each of R$_7$ and R$_8$ represents a substituted or unsubstituted hydrocarbon group, in case that a ring containing an S atom is formed, an aromatic group is not to be included, and the atom adjacent to the S atom of R$_7$ and R$_8$ is not S, Formula (4)

wherein M represents a hydrogen atom, a metal atom, or quaternary ammonium; Z represents a nitrogen-containing heterocyclic ring excluding an imidazole ring; n represents an integer of 0-5; R$_9$ represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an arylcarbonyl group, an acyloxy group, a carboxyl group, a carbonyl group, a sulfonyl group, an amino group, a hydroxyl group, or a heterocyclic group, and when n is at least 2, each R$_9$ may be the same or different and may be joined to form a condensed ring.

5. The display element of claim 1, wherein the electrolyte satisfies condition of Formula (1):

$$0 \leq [X]/[Ag] 0.01$$  Formula (1)

wherein [X] represents mol concentration (mol/kg) of halogen ions or halogen atoms contained in the above electrolyte, and [Ag] represents total mol concentration (mol/kg) of silver or a compound containing silver in the chemical structure contained in the electrolyte.

6. The display element of claim 1, wherein applying temperature of the aqueous mixture is 25-85° C.

7. The display element of claim 1, wherein the aqueous mixture is cooled to 1-25° C. after applying the aqueous mixture onto at least one of the counter electrodes.

8. The display element of claim 7, wherein viscosity of the cooled aqueous mixture is 100-1,000,000 mPa·s.

9. The display element of claim 1, wherein coating thickness of the aqueous mixture is 10 to 200 μm.

10. The display element of claim 1, wherein an amount of the polysaccharide thickener in the aqueous mixture is 0.01 to 2% by weight with respect to water.

11. The display element of claim 1, wherein the counter electrodes are subjected to driving operation so that silver was dissolved and deposited.

12. The display element of claim 10, wherein the driving operation results in deposition of blackened silver under application of voltage of at least deposition overvoltage and deposition of blackened silver is continued under application voltage of at most deposition overvoltage.

* * * * *